United States Patent
Ruvio et al.

(10) Patent No.: US 10,992,495 B2
(45) Date of Patent: *Apr. 27, 2021

(54) MEANS AND METHODS FOR REGULATING CAN COMMUNICATION

(71) Applicant: Red Bend Ltd., Hod Hasharon (IL)

(72) Inventors: Guy Ruvio, ElAd (IL); Saar Yaacov Dickman, Zur-Moshe (IL); Yuval Weisglass, Kfar-Saba (IL); Zachi Avatichi, Gan-Yavne (IL)

(73) Assignee: Red Bend Ltd., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,723

(22) Filed: Nov. 27, 2019

(65) Prior Publication Data

US 2020/0106638 A1 Apr. 2, 2020

Related U.S. Application Data (63) Continuation of application No. 15/750,781, filed as application No. PCT/IL2016/050854 on Aug. 4, 2016, now Pat. No. 10,530,605.

(Continued)

(51) Int. Cl.
*G06F 13/00* (2006.01)
*H04L 12/40* (2006.01)
*G05B 19/042* (2006.01)

(52) U.S. Cl.
CPC .... *H04L 12/40078* (2013.01); *G05B 19/0423* (2013.01); *H04L 12/40013* (2013.01);

(Continued)

(58) Field of Classification Search
CPC ......... H04L 12/40078; H04L 12/40169; H04L 12/40013; H04L 2012/40273; G05B 19/0423; G05B 2219/2637
See application file for complete search history.

(56) References Cited

U.S. PATENT DOCUMENTS

| | | | | |
|---|---|---|---|---|
| 5,574,848 A | * | 11/1996 | Thomson | H04L 12/40013 714/2 |
| 8,560,125 B2 | * | 10/2013 | Wallaert | G05B 15/02 700/276 |

(Continued)

FOREIGN PATENT DOCUMENTS

| | | |
|---|---|---|
| DE | 112012006879 | 5/2015 |
| WO | WO 2014/039035 | 3/2014 |
| WO | WO 2017/021970 | 2/2017 |

OTHER PUBLICATIONS

Communication Pursuant to Article 94(3) EPC dated Sep. 30, 2019 From the European Patent Office Re. Application No. 16832429.1. (8 Pages).

(Continued)

*Primary Examiner* — Jing-Yih Shyu
(74) *Attorney, Agent, or Firm* — McCoy Russell LLP (57) ABSTRACT

Methods, systems, and devices manipulate operation of at least one electronic control unit (ECU) connected to a controller area network (CAN) bus. The at least one ECU includes at least one error counter, by counting errors associated with at least one ECU. The manipulating is based on generating and broadcasting via the CAN at least one bit stream destined to at least one ECU, thereby manipulating at least one ECU status, determined by the ECU error counter and querying for its status state.

17 Claims, 2 Drawing Sheets

Related U.S. Application Data (60) Provisional application No. 62/201,608, filed on Aug. 6, 2015.

(52) U.S. Cl.
CPC ............... *H04L 12/40169* (2013.01); *G05B 2219/2637* (2013.01); *H04L 2012/40215* (2013.01); *H04L 2012/40273* (2013.01)

(56) References Cited

U.S. PATENT DOCUMENTS

| | | | | |
|---|---|---|---|---|
| 8,977,794 B2* | 3/2015 | Grohman | ............... | G05B 15/02 710/104 |
| 9,350,617 B2* | 5/2016 | Hartwich | .............. | H04L 1/0002 |
| 2006/0262807 A1 | 11/2006 | Aoki et al. | | |
| 2009/0183033 A1 | 7/2009 | Ando | | |
| 2011/0188371 A1* | 8/2011 | Brunnberg | ........ | H04L 12/40006 370/216 |
| 2014/0247122 A1* | 9/2014 | Moeller | ................. | B60R 25/10 340/426.25 |
| 2018/0241584 A1 | 8/2018 | Ruvio et al. | | |

OTHER PUBLICATIONS

International Preliminary Report on Patentability dated Aug. 23, 2017 From the International Bureau of WIPO Re. Application No. PCT/IL2016/6050854. (31 Pages).

International Search Report and the Written Opinion dated Nov. 29, 2016 From the International Searching Authority Re. Application No. PCT/IL2016/050854. (11 Pages).

Official Action dated Apr. 18, 2019 From the US Patent and Trademark Office Re. U.S. Appl. No. 15/750,781. (29 pages).

Supplementary European Search Report and the European Search Opinion dated Jan. 29, 2019 From the European Patent Office Re. Application No. 16832429.1. (11 Pages).

Di Natale "Understanding and Using the Controller Area Network", Inst.Cs.Berkeley.Edu, Retrieved From the Internet, p. 1-47, Oct. 30, 2008. Section 2.5.3-2.5.5.

Wolf et al. "Security in Automative Bus Systems", Proceedings of the Workshop on Embedded Security in Cars, ESCAR '04, p. 1-13, Nov. 30, 2004. p. 4, Section 'FlexRay'.

\* cited by examiner

MEANS AND METHODS FOR REGULATING CAN COMMUNICATION

CROSS-REFERENCE TO RELATED APPLICATIONS

This application claims priority to and is a continuation of U.S. application Ser. No. 15/750,781 filed Feb. 6, 2018, issued as U.S. Pat. No. 10,530,605, which was the National Stage filing of International Application No. PCT/IL2016/050854, titled MEANS AND METHODS FOR REGULATING CAN COMMUNICATION filed on Aug. 4, 2016, which claimed the benefit of U.S. Provisional Application No. 62/201,608, filed on Aug. 6, 2015, the content of which is expressly incorporated by reference in its entirety.

FIELD OF THE INVENTION

The present invention relates to means and methods providing security and safety to CAN bus communication in general and in particular to protecting in vehicle systems from cyber-attacks and/or technical difficulties by interfering with the data traffic between ECUs within a vehicle.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in the operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

The last two decades have seen a vast increase in implementation of electronic systems in vehicles. These systems are configured to control and/or monitor almost every aspect of vehicle operations. Possible applications range from engine operations, driving assistance modules, steering control, door opening and locking, speed sensors, light control, safety mechanisms (e.g. ABS brakes, air bags and etc.), and others as known in the art. The communication means and software protocols connecting between a vehicle's electronic systems (electronic control units) and sensors is known as CAN (controller area network) bus. CAN regulate the way in which the data is transferred between different ECUs and allows cars to optimize performance, act on emergency, and become economical and safer.

Currently, there are no efficient, cost effective and simple means to stop anyone with malicious intent and some computer programming skills from taking command of a vehicle via its electronic systems and portions. Following access, a person with a malicious intent could control any vehicle feature. Although current vehicle communication systems are configured to cope with various technical difficulties, they are mostly unsecure against malicious attacks. Further, connecting external communication systems to the vehicle, such as mobile communication, and multimedia networks increase the susceptibility of the vehicle systems to attacks from the outside. A person with malicious intent can interfere with the CAN communication and transmit faulty communication frames or faulty error frames in attempt to change the reaction of at least one ECU. Another vulnerability in entailed in the fact that almost all possible bus messages, their respective structures and communication protocols are specified in publically available documents.

The CAN protocol is based on the principle of broadcast transmission. Generally, data is sent to all the nodes in the network, including to the destination node. Typically, an ECU connected to a CAN constantly monitors traffic for data indented for them to process while discording the rest.

Some of the important CAN features include speed, data length and being an event trigger mechanism. The event trigger mechanism means that the transmission of data is prompt only when a specific event occurs. For example pressing a button or a pedal will cause a transfer of data. CAN utilizes an addressing system based on identifiers rather than physical addresses for each node. In addition each identifier assigns a priority to the respective message based on binary value. If a node in a CAN detects an error, it will immediately abort the transmission and broadcast an error frame consisting of an error flag made up of a bit string that violates the bit stuffing rule, all other nodes will respond by transmitting error flags too. Following a sufficient number of error flags, a node will eventually turn itself off.

Another important use of affecting CAN communication is the possibility to override technical problems by manipulating CAN traffic.

Prior art article "CAN ERROR INJECTION, A SIMPLE BUT VERSATILE APPROACH", H. Webermann, A. Block, 2012, esd, electronic system design, pg. 14-19, discloses a CAN system bus implemented with an error injector. The Error injector is configured to insert various errors, when triggered, into the bus communication. Working in parallel to the normal function of the CAN controller, the invention uses the errors as means to control the distribution of the frames. A detected error will cause the frame to be destroyed, using the principle that dominant bits cannot be overridden by recessive bits. The error injector is implemented as a bit stream injector, which can be triggered by several trigger modules.

Another example of bus security solutions is WO 2013/144962 A1 titled: "SECURITY SYSTEM AND PROTECTING A VEHICLE ELECTRONIC SYSTEM". This innovation discloses a security system for a vehicle electronic system by selectively intervening in the communications path in order to prevent the arrival of malicious messages at ECUs, in particular at the safety critical ECUs. The security system includes a filter which prevents illegal messages sent by any system or device communicating over a vehicle communications bus from reaching their destination, and the option of setting a rating of suspicious messages transferred through. Further the system discloses the filtering of a message according to message ID, message data field, message length, and according to the port the message was received.

However, all of the above examples utilize means and methods aiming at cancelling and/or filtering malicious messages requiring a lot of time and/or effort, and may require initial knowledge about the network architecture, number of ECUs, proprietary commands and so on. In addition, there are currently no means of addressing any malicious or faulty communication that has succeeded in passing through to at least one ECU.

There is a long felt need for means and methods that can divert the effect a malicious communication has on an existing ECU by manipulating the ECU response to these communications.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The present invention provides a security system, useful for vehicle CAN bus communication in general and in particular to protecting in vehicle systems from cyber-attacks and/or technical difficulties by interfering with the data traffic between ECUs within a vehicle.

The details of one or more embodiments are set forth in the accompanying drawings and the description below. Other features, objects, and advantages of the invention will be apparent from the description and drawings, and from the claims.

BRIEF DESCRIPTION OF THE FIGURES

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings. In order to better understand the invention and its implementation in a practice, a plurality of embodiments will now be described, by way of non-limiting example only, with reference to the accompanying drawings, in which FIG. 1 graphically illustrates, according to another preferred embodiment of the present invention, a flow chart, according to another preferred embodiment, of the present invention method for preventing an unauthorized access via signal interception to a user's mobile device.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "transferring", "detecting," "calculating", "processing", "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

The essence of the present invention is to provide a system and method for vehicle CAN bus communication in general and in particular to protecting in vehicle systems from cyber-attacks and/or technical difficulties by interfering with the data traffic between ECUs within a vehicle.

It is further in the scope of the present invention to be implemented with any ECU connected to a CAN system including in vehicles, in automated environments (buildings, medical facilities, elevators, air conditioners), emergency systems, lighting systems and others as known in the art of CAN implementation.

Figure 1:
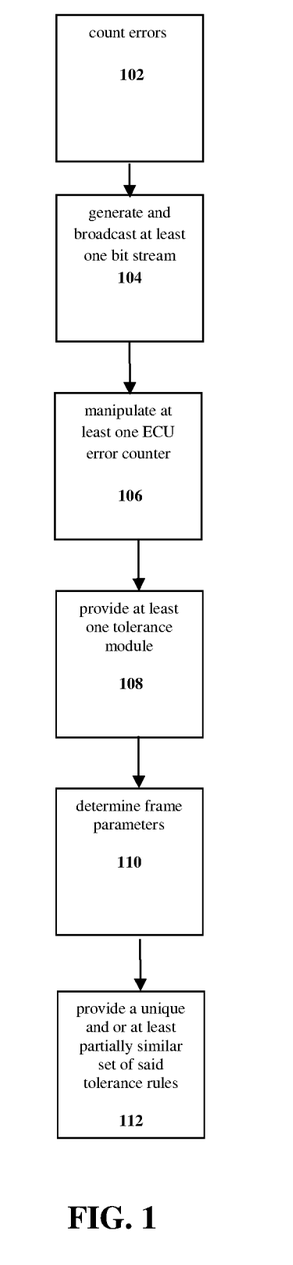

As a non-limiting example, the method for manipulating operation of at least one electronic control unit (ECU) connected to a controller area network (CAN) bus, at least one said ECU comprising at least one error counter using a computerized process according to the example method 100 illustrated in FIG. 1. As illustrated in FIG. 1, the method 100 can first count errors 102 associated with at least one said ECU; generate and broadcast via said CAN at least one bit stream 104 destined to at least one said ECU, thereby manipulating at least one said ECU status, determined by said ECU error counter and querying for its status state; manipulate at least one ECU error counter 106 according to at least one selected from a group consisting of: frames associated with said ECU being manipulated, frames associated with one or more ECUs not being manipulated, and any combination thereof; provide at least one tolerance module 108 operable in communication with said CAN, configured to set said tolerance rules according to predetermined data, data learned over time, data updated in real time, and any combination thereof; determine at least one of the following: whether to transmit at least one frame, amount of frames, the rate in which consecutive frames are transmitted, frame type transmitted, and any combination thereof 110 by said BSGM, according to a set of tolerance manipulating rules; and provide each said ECU a unique and or at least partially similar set of said tolerance rules 112.

The term "vehicle" interchangeably refers hereinafter to any means of transportation that has at least one ECU attached to it, including, but not limited to, any motor vehicle, any aircraft, (e.g. helicopter, airplane), any emergency transport device such as an ambulance, fire engine and etc., any load carrying device such as a truck, van, and etc., any wheeled device such as car, truck, bus, sports car, cab, cabriolet, camper, motorcycle, scooter, bicycle, and etc., any outdoor field transport device such as a Jeep, jet ski water, snowmobile, snow plough, tank, and etc., any water transportation device such as a boat, ship, tank, steam boat, submarine, and etc., any agricultural transport device such as a combine, and etc., any construction transportation device such as a bulldozer, a tractor, fork-lift truck, dump truck and etc., any rail transportation device such as a train, cart, locomotive, tram, tramcar, and etc., any off-road vehicle, rocket, space capsule, spacecraft, space probe, spaceship, satellite, space shuttle, and the like as known in the art.

The term "CAN", "Controller Area Network", refers hereinafter to any controller network with a frame based protocol, for communication between devices without a host computer. CAN further provides a multi-master redundant network, operating even if some of the nodes are not functioning. CAN frames are not associated with a recipient address but are classified over their identifier. As a consequence, CAN controllers broadcast their frames to all connected nodes, when all receiving nodes decide independently whether to further process the received frames. CAN communication applies a decentralized priority driven access control methods to guarantee the transmission of a top priority frame first and an error detecting mechanism that can detect errors and interrupt communication. Further the term CAN includes, but not limited to, event triggered CAN bus, time triggered CAN bus, multimedia connected CAN bus, wireless connected CAN bus, or local small autonomous network such as LIN (local interconnected network) bus. Each message sent between two network devices is often subdivided into packets comprising units of binary data being communicated through a computer network by the underlying hardware and software. Depending on the protocol, packets are usually constructed in some standard format determining their boundaries, origin and destination. Packets get encapsulated into frames in the data link layer so that they can be transferred over different media to the end destination. The term "frame" interchangeably refers hereinafter to a message format that is communicated in a CAN network. This includes both the base frame format (11 bits ID) and the extended frame format (29 bits ID made up of the 11-bit identifier ("base identifier") and an 18-bit extension ("identifier extension"). Additionally or alternatively, the term further includes the following frame types: data frame: a frame containing node data for transmission; remote frame: a frame requesting the transmission of a specific identifier; error frame: a frame transmitted by any node detecting an error; and, overload frame: a frame to inject a delay between data and/or remote frame.

Error in a CAN network can occur in the bit level and/or at the frame level. These errors can include such as cyclic redundancy check (CRC), bit stuffing, monitoring, frame, and acknowledgement errors. If a node detects an error, it will immediately abort the transmission and broadcast an error frame consisting of an error flag made up of a bit string that violates the bit stuffing rule, all other nodes will respond by transmitting error flags too. Following a sufficient number of error flags, a node will eventually turn itself off.

Errors are divided into transmission errors and receiving errors. In a vehicle it is vital to know whether the errors are transient (such as due to noise, electrical surges, or any temporary condition) or permanent due to failure of the node due to defective hardware. Consequently each node (ECU) includes an error counter, keeping track of the number of errors transmitted and received. Typically, the error count can affect the status of the node as follows:

Each node is configured to operate in one of the three states: error active, error passive and bus off. The terms "active" and/or "passive" refer to the type of error frame that the node is allowed to send if it had detected an error. An error active status indicates that, the node is fully functional. The node is active on the network and can transmit Error Active frames. When the node is in Error Active state then whenever it detects an error it can interrupt the transmission by sending an Error Active frame. An Error Active frame comprises six dominant (i.e. '0's) bits which override what is currently being transmitted on the bus. It interrupts the current transmission and all the nodes on the bus including the transmitter are aware that an error was detected.

Unlike Error Active, when the node is in error passive status mode, the node is restricted from sending an Error Active frames. This means that if the node detects an error then it can send an Error Passive frame which consists of 6 recessive (i.e. '1's) bits. Since the recessive bits do not interrupt the transmission then the transmitting node can continue its transmission without interruption. Other than the difference in the type of Error frame that the node is allowed to send, there are no other differences and the node can transmit normal frames like any other node on the bus. Error counts above as a non-limiting example 255, will cause the node to enter an bus-off mode, without transmission on the bus.

Typically, receive errors raise the error count by one (or any predefined number) and transmit errors raise the count by eight (or any other predefined number). Error free messages lower the count by one (or any other predefined number).

If the error count returns to zero normal activity is resumed. When in offline mode, a node in the bus off (offline) condition configures a predetermined number of consecutive recessive bits have been monitored. If a node is detecting an error while it is transmitting a normal frame (either that it detected the error by itself or some other node transmitted an Error Active frame and interrupted its transmission) it then increases the error count by 8 (TX_ERROR_COUNTER=TX_ERROR_COUNTER+8). When the error counter crosses the 127 level (128 and above) it changes from Error Active to Error Passive state. When the error counter reaches 256 then the node is switched to Bus-Off state and is no longer allowed to transmit any messages.

When the node is not in Bus-Off then every successful transmission of a normal frame causes the error counter to be decreased by 1. This allows the node to recover back to Error Active state in case there are no more problems caused by this node's transmissions.

The term "bus", interchangeably refers hereinafter to a communication device used to logically connect at least two peripherals on the same wires or wireless means. This includes relaying communication between two or more peripherals (e.g. nodes, ECUs). Additionally or alternatively, the bus can transfer data between components of the same computer, between different computers, between at least one peripheral and another bus, between other buses and any combination thereof. For example, expansion buses can be further connected to a system main bus (e.g. that is connecting a CPU with a memory unit), and form any peripheral bus. Other buses can be separate from a main CPU architecture, and can in fact support many CPUs thereby forming a network. Further, the term bus includes, but is not limited to all related hardware components (wire, optical fiber, etc.) and software, including communication protocols, for the operation of the bus. Additionally or alternatively, the bus can provide serial communication or parallel communication and can be connected in different topologies. Since all nodes in a system bus share the same communication line, schemes for avoiding collisions and interruptions and means of ordering an access to a combined source can be included. For example, a bus can be connected to a channel controllers, which is a small computer dedicated to handling the input and output of a given bus.

The term "nodes" refers hereinafter to any system or device connected to a network. This includes but is not limited to: an ECU (electronic control unit), a connection point, a redistribution point, a communication endpoint, a form of terminal equipment, a sensor, a computer, an electrical circuit, an electrical device or monitor, and others as known in electronic communication. The node can include features such as an additional communication port or bus connection. Additionally or alternatively, a network node is an active electronic device that is attached to a network, and is capable of sending, receiving, or forwarding information over a communications channel.

The term "ECU" refers hereinafter to any electronic control unit or embedded system that controls and/or monitors one or more of the electrical systems or subsystems in an apparatus such as a vehicle. This further includes hardware and software required to perform the functions expected from that particular module. These systems include but are not limited to: Electronic/engine Control Module (ECM), engine control unit, Door control unit (DCU), Transmission control unit (TCU), Brake Control Module (BCM; ABS or ESC), Battery management system, Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, control module, and other ECU's as known in the art. In addition the term further includes: Engine management ECU can be any ECU that controls one or more actuators on an engine to ensure optimal engine performance. This includes as non-limiting examples an ECU controlling the air-fuel mixture, ignition timing, idle speed, ignition timing, variable valve timing, electronic valve control, emission control, NOx control, regeneration of oxidation catalytic converter, turbocharger control, engine cooling system control, throttle control, lambda control, on-board diagnostics control, lubrication system control, fuel injection rate control and others as known in the art; A safety related ECU can include as non-limiting examples: anti-lock for the brakes, airbag control, hill descent control, emergency brake assistance system, front collision alert, and others as known in the art; passenger comfort related ECU like door control ECU, climate control (e.g. venting and/or air conditioning ECU; automatic or adaptive, electronic seat adjustment with memory, automatic wipers, automatic headlamps—adjusts beam automatically, lighting within the vehicle, and etc.; driver assistance related ECU can include these non-limiting examples: lane assist system, speed assist system, parking assistance system, blind spot detection, distance from a nearby object (e.g. car, wall), adaptive cruise control, hill start assist (e.g. hold the car for 10 seconds on an incline while you engage the clutch and accelerate), active trace control, Electric Power Steering Control Unit (PSCU); Human-machine interface (HMI) ECU, and others as known in the art; Chassis electronics ECU including ABS—Anti-lock Braking System, TCS—Traction Control System, EBD—Electronic Brake Distribution, ESP—Electronic Stability Program, body motion control, Active Engine Brake when cornering; Telematics control unit (TCU); Central Timing Module (CTM); Battery management ECU; infotainment system; and, any combination thereof.

Additionally or alternatively, one assembly incorporates several of the individual control modules (PCM is often both engine and transmission). It is further in the scope of the present invention that at least a two of a vehicle's ECU's are operatively connected by a CAN bus.

The term "ECU characteristics" interchangeably refers hereinafter to one or more of these non-limiting examples: the systems related to the ECU (e.g. safety related such as brakes, airbags, operating such as steering, engine, passenger comfort such as windows operation, efficiency related such as engine management, and any other ECU function group), the sensor related to the ECU, the frequency of data transmission from the ECU, the frequency of the ECU being is a specific status in a predetermined amount of time, timing characteristics of ECU transmission, electrical characteristics of said ECU transmitted frame, noise characteristics of the ECU transmitted frame, data frame content of typical frames originating with said ECU, physical characteristics of said ECU Physical characteristics of the ECU refer herein after to any of the following non limiting examples: connector type and number, type of wire/cable, pin-outs, circuit configuration, wireless connection configuration and properties, if present, material any of the components are made of, number and type of any physical components embedded, such as conductors, resistors and etc., and any combination thereof.

The term "Time based characteristics" interchangeably refers hereinafter to timing of frames within the CAN communication. Time based characteristics can be assessed for every specific frame and evaluated as to the relationship to one or more frames in terms of their timing. Initial timing of a frame includes: timing and synchronization and variation of the bit nominal time, specifically compared and analyzed to generate a value of time quanta within the bit nominal time segment (sync, prop, phase 1 and phase 2); timing and synchronization of frames in terms of system logic following an event (e.g. value received from a sensor), timing and synchronization of frames in terms of system logic following another frame (e.g. which frame is followed by another and when), and any combination thereof. Typically, CAN bus nodes are requested to be synchronized on the bit edges so that every node agrees on the value of the bit currently transmitted on the bus. To do so, each node implements a synchronization protocol. This ensures that the timing relations between a sent frame and a response frame are relatively reproducible.

Timing of more than one frames includes for example one frame from a specific node always transmitted following another specific frame from a designated node in a predetermined time lapse range); the transfer rate of an incoming frame is analyzed and compared to other system frames transfer rate, and any timing base data learned by the system and or inputted therein.

Timing analysis further includes, but not limited to, statistical analysis including average frame time difference, standard deviation of frame timing, and assurance of the statistical significance of the result (e.g. tests such as T-test, determining P value and as such). Further in the scope of the invention is calculating a timing parameter according to at least one of the aforementioned time based characteristics. This can further include calculating a value comprising individual timing of a frame and relevant timing in relevance to the system logic.

A dedicated algorithm measures the validity of an incoming frame based on statistical analysis, including a probability matrix, and/or a Gaussian probability curve. The purpose of preforming bus timing analysis is to extract the timing characteristics of the specified frame. Following statistical analysis the process can include clustering of the data to main groups and within them calculating the probabilities of each data point. In addition, a calculation can be performed to see the probability for any random new data point to be located in a specific cluster. Additionally or alternatively, a Markov model is utilized to determine the possible transition states. After executing at least initial timing analysis by such an algorithm in combination with a Markov model modeling the transitions possible of the data points, evaluating the probability of an event, is possible. Additionally or alternatively, rules can be applied in accordance with the system's expectations calculated by the algorithm. Additionally or alternatively, threshold values can be implemented in the algorithm following an initial analysis of a data set. Additionally or alternatively, each data set of a communication comprising frames comprising frames can be used to generate and evaluate timing characteristics specific to it. Additionally or alternatively, any change in the possible transitions states, the probability, the mean values (e.g. of a cluster or between clusters), variance, correlation, or spectral density of the data points can be an anomaly of a timing characteristic.

The term "Electrical based characteristics" interchangeably refers hereinafter to different aspects of the physical electrical environment layer such as, voltage, current, number of conductors, impedance, RF emission and/or receiving, frequency. Additionally or alternatively, the noise characteristics on the transmission (e.g. on the electrical signal, on the RF signal) can be examined and referred to as a characteristic of the communication for the purpose of identification of an attack originator and mapping of the communication system.

The term "Learned over time" interchangeably refers hereinafter to the application of leaning algorithms and/or heuristic means for analyzing communication data (including frames send and received, their timing characteristics, their electrical characteristics, their data content, their noise characteristics, the events and/or sensor values relating to them, and as such) and for example detecting patterns and/or action and result sequences in order to make rules, assessments, expectations, of the system, including defining a base for comparison of future communication related activities.

The term "attack" in reference to an 'attack originator' refers herein to any attempted damage, unauthorized use or unauthorized access to bus communication or any connected ECU. This includes, as non-limiting examples: Unauthorized use of at least one ECU, unauthorized access to a communication; Communication timing attacks—such as delaying at least one communication packet/frame, changing the order of forwarding at least one communication packets/frame; Information attacks-leaking of at least a portion of information, false representation of at least a portion of the data, disruption, change, erasing at least a portion of the packet format, or information, changing the origin or destination of at least a portion of the communication, creating false communication, copying at least a portion of the information communicated, sending false validations; configuration attacks—such as false software update, false change in configuration, changing the access control, attacks against at least one ECU-such as preventing at least one ECU from operating normally or operating at all, propagation of malicious code (e.g. virus or worm); physical attacks—such as forcing rebooting, re-flashing booting modified software, attack on the core network—such as traffic tunneling between impersonated devices, using a rogue device, submitting multiple requests in an intention to overload the network and or the ECU; user data and identity attacks—such as impersonation of a device, retrieval of information of a specific user or a specific ECU, changing the access of users to the system, and others as known in the art.

The term "tolerance manipulating rules" interchangeably refers herein to any set of instructions that determine the output of the means and methods of the present according to the input received.

In an embodiment the tolerance rules can change according to a detected anomaly in communication or any predefined scenario of ECU function/dysfunction. The anomaly can be detected by a CAN traffic monitor module configured to monitor all CAN communication.

Examples for tolerance manipulating rules include but are not limited to:

When a repeated message is received from an ECU causing the error count to rise leading to the consequent off-line status of an ECU, the tolerance manipulating rules can state that while a second ECU provides a predefined information X, the status change of the ECU will be delayed until a different threshold is reached. Therefore the present invention means and methods will manipulate the error count of that specific ECU such that the status is not changed until a new threshold is reached (as monitored by the CAN traffic monitor). Additionally or alternatively, the rule can maintain that a specific ECU status is elevated for example from normal to error active or error passive by adding to the error count, when a specific event is monitored by the CAN traffic monitoring module, such that a status change to off-line is reached earlier than was expected. Additionally or alternatively, the error count can be manipulated to change any status to any other status by reducing or adding or resetting the error count. In an embodiment the tolerance manipulating rules can change according to a predefined driving plan. For example, when driving in a partially functional vehicle (at least one un-operable or dysfunctional ECU), for driving in a status defined as an emergency, when an external system or the CAN traffic monitor detects a malicious attack on at least one ECU, and any combination thereof. When an external system or the CAN traffic monitor detects a malicious attack on at least one ECU, the present invention means and methods can maintain a predefined error count of at least a combination of ECUs for example those necessary for maneuvering the vehicle in a predefined speed and while for example disconnecting the ECUs most venerable to attack. Additionally or alternatively, if the compromised ECU attack originator is known it can be disabled by forcing the error count to change status to offline. Another example is maintaining a state different than off-line at the necessary ECUs, thereby limiting the damage of an infiltrated system. An example can include a communication functionally disabling the brake system ECU by a raised error count while accelerating the engine. The present invention system and methods can effectively lower the error count of the brake ECU.

Power sliding doors, a common feature in minivans, are operated by an ECU. Sensors constantly report whether the door is open or closed, and when the driver pushes a button to close the door, the signal from that switch is broadcast across the network. When the ECU gets that signal, it checks the data stream to make sure the car is in park and not moving. If all is well, it then gives a command to a power circuit that energizes the motors used to close the door. It goes even further, though—the ECU then monitors the voltage consumed by the motors. If it detects a voltage spike, which happens when a door is hindered by an errant handbag or a wayward body part, the ECU immediately reverses the direction of the door to prevent potential injury. If the door closes properly, the latch electrically locks the door shut.

Additionally, CAN network can be connected to all the engine sensors for a self-diagnosis. With this interconnection, a designated ECU can watch the network for problem reports broadcast to the network as OBD-II codes. If an ECU detects a problem, it broadcasts it as an alphanumeric code and the Check Engine light is turned on. Modern cars carry out these self-checks any time the car is running. Anyone with a handheld code reader (see Digital Diagnostics) can plug into the standard 16-pin data port in the driver footwall and retrieve fault codes. An Internet search will usually explain the fault or at least give a hint at the problem.

That same data port also comes in handy if a manufacturer uncovers a computer glitch or wants to modify how the car operates. For example, a carmaker may develop an algorithm for smoother transmission shifts. Installing it in any customer car is as simple as a dealer technician plugging his computer into the data port and uploading the new software. Before CAN, this would've meant physically replacing an ECU.

Anomaly detection refers herein to any identification of such as but not limited to: items, events, patterns, observations which are incompatible and/or dissimilar and/or do not conform to a previously defined or expected event, event duration, event frequency, pattern or observation in a data set. Additionally or alternatively the comparison can be to a statistical expected value, to a range of defined values or one or more predefined exact values. The term further interchangeably refers to such as deviations, exceptions, peculiarities, surprise, noise, novelties, outliers and the like of one data compared to another. Additionally or alternatively, the anomaly detection technic is unsupervised anomaly detection, supervised anomaly detection, semi-supervised anomaly detection, and any combination thereof. Supervised anomaly detection refers to detection based on exiting normal data labels and anomalies data labels. Semi-supervised anomaly detection refers to the occurrence of a limited amount of labeled data in the process of detection. This typically involves the creation of a model based on the limited data set followed by testing the statistical significance of a test instance to be generated by the model. Unsupervised anomaly detection—No data labels available, bases on the relatively low occurrence of abnormal data characteristic. Additionally or alternatively, the anomaly is a point anomaly, contextual anomaly, structural anomaly, collective anomaly, and any combination thereof. Additionally or alternatively, statistical means are employed to examine the occurrence of an anomaly and to try and determine whether its occurrence is a stochastic process, has a certain degree of probability, whether it is a time and/or activity related event. Additionally or alternatively, anomaly refers to any divergence from a possibility probability matrix generated (predefined and/or self-learned, and or updated) to predict at least one event such as the probability of a specific frame to follow another frame, each having its own defined characteristics and/or their relative values have a specific characteristic and/or their connection provides a related characteristic. Additionally or alternatively, the anomaly detection compares at least one of: one or more bit content, arbitration field content, control bit content, data bit content, CRC field content, at least one frame, at least one message comprised of a plurality of frames, at least one frame characteristic, at least one frame relation characteristic, and ant combination thereof.

The term "third party" in reference to the present invention interchangeably refers herein to at least one of these non-limiting examples: a computer, a terminal, a phone, a cellular phone, a PDA, an E-mail, a server, an additional security system, an administer, a node, an ECU, a vehicle central computer, a vehicle driver, a vehicle passenger, cloud computing means, and any combination thereof.

The term "Computer readable media", (CRM), interchangeably refers hereinafter to any medium, e.g., a non-transitory medium, capable of storing data in a format readable by a mechanical device (automated data medium rather than human readable). Examples of machine-readable media include magnetic media such as magnetic disks, cards, tapes, and drums, punched cards and paper tapes, optical disks, flash memories, barcodes and magnetic ink characters. Common machine-readable technologies include magnetic recording, processing waveforms, electronic memory encoding, and barcodes. Optical character recognition (OCR) can be used to enable machines to read information available to humans. Any information retrievable by any form of energy can be machine-readable. Further a processor can access this CRM to retrieve store information, to edit, delete or add information and any combination thereof.

Figure 2:
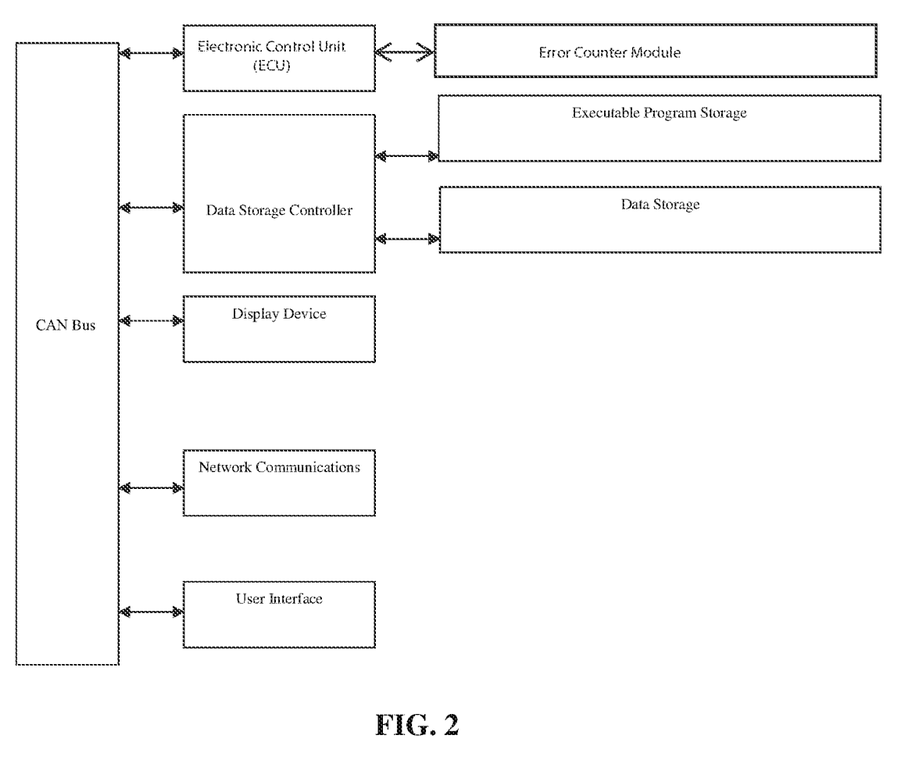
FIG. 2 graphically illustrates, according to another preferred embodiment of the present invention, an example of computerized environment for implementing the invention.

Reference is made now to FIG. 2 which graphically illustrates, according to another preferred embodiment of the present invention, an example of computerized system for implementing the invention 200. The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), touch-screen; or touch-pad, virtual display, or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as C, C++, Assembly, C#™, JAVA™, Flash™ ActionScript, Visual Basic™, JavaScript™, PHP, Python, XML, HTML, etc. or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as TCP/UDP/ICMP/HTTP/DNS/SOAP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Google™ Android™, Unix™/X-Windows™, Windows Mobile™, Windows Phone™, Linux™, etc.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of environment tracking systems, data representing user events, virtual elements, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

What is claimed is:

1. A method for manipulating operation of at least one electronic control unit (ECU) connected as a node to a controller area network (CAN) bus, said at least one ECU comprising at least one error counter, the method comprising:
    a. counting errors associated with said at least one ECU, by said at least one error counter;
    b. generating at least one bit stream destined to at least one ECU,
    c. setting tolerance rules according to at least one of: predetermined data, data learned over time, data updated in real time, and any combination thereof,
    d. manipulating at least one ECU status, determined by an ECU error counter, by transmitting said at least one bit stream according to said tolerance rules and a queried status state of said at least one ECU;
    wherein said tolerance rules are similar for each node of said CAN bus.

2. The method according to claim 1, wherein said manipulated at least one ECU status is selected from a group consisting of: normal, error active, error passive, offline, and any combination thereof.

3. The method according to claim 1, additionally comprising affecting said at least one ECU error counter by: lowering ECU error count, elevating ECU error count, maintaining a predetermined error count, resetting ECU error count, and any combination thereof.

4. The method according to claim 1, further comprising monitoring frames destined to at least one ECU and manipulating at least one ECU error counter according to at least one of:
    a. at least one frame origin;
    b. at least one frame destination;
    c. a pattern of a plurality of frames;
    d. a sequence of frames;
    e. at least one frame content;
    f. predetermined threshold of monitored frames;
    g. at least one frame type; and
    h. any combination thereof.

5. The method according to claim 1, further comprising manipulating at least one ECU error counter according to at least one of: frames associated with the at least one ECU being manipulated, frames associated with one or more ECUs not being manipulated, and any combination thereof.

6. The method according to claim 1, wherein each of said at least one ECU is provided with at least one of a unique set of tolerance rules and a partially similar set of tolerance rules.

7. The method according to claim 1, wherein said CAN bus is implemented in a vehicle, wherein said tolerance rules are determined according to real time operation characteristics of said vehicle.

8. The method according to claim 1, wherein said tolerance rules are set according to at least one ECU characteristic.

9. The method according to claim 1, wherein said tolerance rules for at least one ECU are received from at least one third party.

10. The method according to claim 1, wherein said CAN bus is a vehicle implemented CAN bus.

11. The method according to claim 1, further comprising monitoring traffic of said CAN bus, associated with at least one ECU.

12. The method according to claim 11, wherein said manipulating said at least one ECU status is according to at least one of: monitored traffic data received by said monitoring, an error counter module count, data received from a third party, data received associated with more than one ECU, data received associated with said at least one ECU, and any combination thereof.

13. The method according to claim 11, wherein said monitoring of said traffic of said CAN bus, is of traffic destined to at least one ECU and is monitoring of at least one of:
    a. at least one frame origin;
    b. at least one frame destination;
    c. a pattern of a plurality of frames;
    d. a sequence of frames;
    e. at least one frame content;
    f. predetermined threshold of monitored frames;
    g. at least one frame type; and
    h. any combination thereof.

14. The method according to claim 1, further comprising transmitting at least one data frame recognized by said at least one ECU as a trigger for performing a function of said at least one ECU.

15. The method according to claim 1, wherein said manipulating said at least one ECU status is according to a combination of: monitored traffic data received from a traffic monitor process, an error counter process count, data received from a third party, data received associated with more than one ECU, data received associated with said at least one ECU.

16. The method according to claim 15, wherein said monitored traffic, is of traffic destined to at least one ECU and is monitoring a combination of:
    a. at least one frame origin;
    b. at least one frame destination;
    c. a pattern of a plurality of frames;
    d. a sequence of frames;
    e. at least one frame content;
    f. predetermined threshold of monitored frames; and
    g. at least one frame type.

17. The method according to claim 1, further comprising transmitting at least one data frame recognized by said at least one ECU as a trigger for stopping a function of said at least one ECU.

* * * * *